Patented Feb. 17, 1931

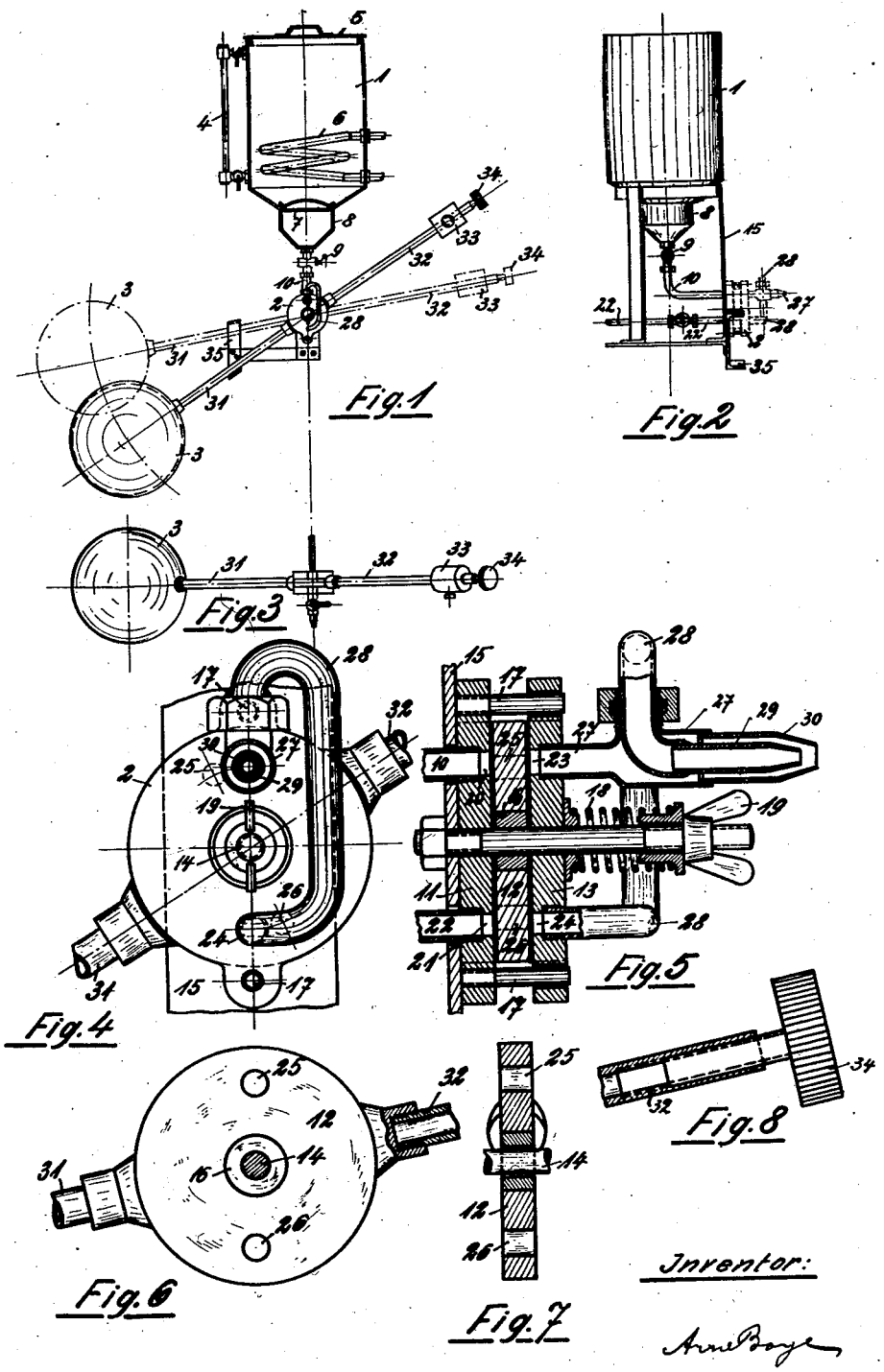

1,792,963

UNITED STATES PATENT OFFICE

ARNE BOYE, OF HAMBURG, GERMANY

FOAM BREAKER

Application filed May 18, 1926, Serial No. 109,887, and in Germany July 3, 1925.

This invention relates to an apparatus for keeping down the foam on fermenting liquids, this apparatus being specially designed for use in the manufacturing of aerated yeast.

In the manufacturing of aerated yeast air is blown from below into the fermenting tub during the fermenting process in order to accelerate the fermentation and to increase the growing of the yeast, whereby, however, intense foaming of the wort is caused so that it would soon flow over the rim of the tub and get lost. Precaution has to be taken to prevent excessive formation of foam or to keep down the foam which is formed. With this object in view so called fermenting-fat is added from time to time to the fermenting wort, this fermenting-fat being injected by hand into the tub in predetermined small quantities in order to keep the consumption as low as possible and to increase the effect of the fat. As the fat is at first viscid and in this state not adapted for its purpose it must be sufficiently heated prior to be used.

It is evident that these manipulations for preventing the formation of foam are very complicated and irregular and that they require time. If the time period during which the injection of the fat has to be carried out has passed, overflowing of the fermenting tub will occur at once.

This invention has for its object to avoid these inconveniences with the aid of a reliably working automatic foam-damper. According to the invention a quantity of the fermenting fat, in accordance with the intensity of the foam formation, is uniformly supplied to a distributing nozzle by means of an automatically acting disk-valve of special construction, to be atomized in the nozzle and distributed in the fermenting tub by a jet of air or steam which is regulated at the same time as the quantity of fermenting fat so that an inadmissibly great formation of foam can never occur. It is advisable to utilize as atomizing means the compressed air designed for the fermentation as the pressure of about 0,3 to 0,4 atm. of this compressed air is quite sufficient to effect a satisfactory atomizing of the fat.

An apparatus for keeping down the foam of fermenting liquids, constructed in accordance with this invention, is shown, by way of example, in the accompanying drawings, in which:—

Fig. 1 shows the total arrangement of the apparatus in front elevation.

Fig. 2 is a side elevation.

Fig. 3 shows in plan view the float with disk-valve.

Fig. 4 shows the disk valve on larger scale.

Fig. 5 shows the disk valve in section.

Fig. 6 shows in plan view the disk of the valve connected with the float.

Fig. 7 is a section of Fig. 6.

Fig. 8 shows the regulating device for adjusting the float in equilibrium.

The apparatus is composed essentially of three groups of elements, the fat reservoir 1 adapted to be heated, the disk valve 2 with atomizing nozzle and the float with counterweight and levers for operating the valve.

The fat reservoir 1 is fitted with a gauge 4 and is closed by a lid 5 having air holes. A serpentine heating tube 6 in the reservoir 1 serves for heating the fat. This heating pipe is connected with a steam pipe. A sieve 7 in the bottom portion of reservoir 1 serves to retain noxious solid constituents of the fat; this sieve is removable. The liquid fat flows out of reservoir 1 through an outflow cock 9 and an outflow tube 10 which leads to the disk valve 2.

The disk valve 2 consists of three circular disks 11, 12, 13 mounted on an axle 14. The disk 11 is rigid with a frame 15, the intermediate disk 12 has a steel sleeve 16 and is loosely mounted on axle 14. The disk 13 is shiftable only in longitudinal direction but prevented from rotating around the axle by two guide bolts 17 fixed on disk 11. These three disks are pressed together by a spiral spring 18, a wing nut 19 serving to regulate the pressure. Disk 11 has a bore 20 to which the outflow tube 10 is connected and a bore 21 to which the conduit 22 for the compressed air is connected. Disk 13 has also two holes 23 and 24 of the same diameter as the bores 20 and 21 and they must stand exactly opposite these bores when the valve is put together. The intermediate disk 12 has two corresponding holes 25 and 26 designed to be made to register with the holes 20 and 23 and with the holes 21 and 24.

An atomizing nozzle 27 is connected to the hole 23 of disk 13 so that fat is directly supplied to the same from the valve, the compressed air being supplied to a nozzle insertion 29 through a tube 21. The fat flows then to the exchangeable nozzle envelope 30 to be atomized at the orifice of the same by the action of the compressed air.

The opening and closing of the disk valve is controlled by the float 3. The float consists of a hollow body of light metal and is connected by a rod 31 with the rotatable disk 12 of the valve in such a manner that a sufficiently long lever arm is formed. A lever 32 is fixed on disk 12 at a point diametrically opposite to the fixation point of rod 31 and a counter weight 33 on this lever 32 serves to ensure the equilibrium of the float. Thanks to this arrangement the buoyancy of the fermentation foam acting upon the float is not unnecessarily influenced by the weight of the float as the over-weight on the arm 31 of the float need be only so great that it is capable to make the float descend again if the foam sinks. An adjusting screw 34 of sufficient weight on the end of the arm 32 serves to accurately adjust the equilibrium actually required by means of which screw the arm 32 can be lengthened or shortened.

The apparatus is fixed on the fermenting tub at a convenient point so that the float is situated in the range of the foam which will be formed.

The operation of the apparatus is as follows:—

As soon as the foam rises the float 3 is lifted and the disk 12 consequently rotates so that the holes 20, 25 and 23 on the one hand and the holes 21, 26 and 24 on the other hand come into register and the liquid fat can flow from reservoir 1 through the tube 10 and through the valve into the mouthpiece 30 of the nozzle, compressed air flowing at the same time through the tube 22 and through the valve to the inner nozzle 29. The fat is then atomized on the orifice of the nozzle by the action of the compressed air and flows into the fermenting wort in finely divided state. The jets of fat and air striking upon the bubbles so that pressing down and destruction of the foam is mechanically effected. The fat spread uniformly over the entire surface of the wort produces, owing to the chemical property of the fat, receding of the foam and prevents any further formation of foam. When the foam recedes the float descends and the disk valve is closed. To prevent the float 3 being lifted too high at a very strong formation of foam, so that it closes the disk valve after having it opened a stop 35 is arranged for the arm 31 so that the highest position of the float corresponds to the open position of the valve. Easy working of the disk valve is ensured as the flowing fat serves to lubricate the mechanism so that, after the apparatus has been adjusted according to requirement, no further attendance is necessary for the mechanism.

The construction of several elements may be modified according to requirement without departing from the idea of the invention.

I claim:—

1. An apparatus for keeping down the foam of fermenting liquids by means of a foam destroying fermenting fat, comprising in combination a regulating valve having two channels one for the passage of fermenting fat and the other for the passage of an air current serving as atomizing medium for the fat, a float operating said valve, and an atomizing nozzle having communication with said two channels positioned for spraying the fermenting fat in finely atomized state on the surface of the fermenting liquid as soon as said regulating valve is automatically opened by said float lifted by the foam.

2. An apparatus for keeping down the foam of fermenting liquid as specified in claim 1, comprising in combination with the two channels one for the passage of fermenting fat and the other for the passage of an air current serving as atomizing medium for the fat, a common shutting off element adapted to open at the rising of the foam both passages at the same time and adapted to close the same at the same time when the foam is sinking.

In testimony whereof I affix my signature.

ARNE BOYE.